United States Patent
Yang et al.

(10) Patent No.: US 11,762,477 B2
(45) Date of Patent: Sep. 19, 2023

(54) INTELLIGENT SUNSHADING LOUVER CONTROL SYSTEM AND METHOD BASED ON GESTURE RECOGNITION

(71) Applicants: TIANJIN CHENGJIAN UNIVERSITY, Tianjin (CN); XI'AN UNIVERSITY OF ARCHITECTURE AND TECHNOLOGY, Xi'an (CN)

(72) Inventors: Bin Yang, Xi'an (CN); Lingge Chen, Xi'an (CN); Xiaojing Li, Xi'an (CN); Angui Li, Xi'an (CN)

(73) Assignees: TIANJIN CHENGJIAN UNIVERSITY, Tianjin (CN); XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 0 days.

(21) Appl. No.: 17/857,123

(22) Filed: Jul. 4, 2022

(65) Prior Publication Data

US 2023/0236669 A1 Jul. 27, 2023

(30) Foreign Application Priority Data

Jan. 24, 2022 (CN) .......................... 202210082499.X

(51) Int. Cl.
*G06V 40/10* (2022.01)
*G06F 3/01* (2006.01)
(Continued)

(52) U.S. Cl.
CPC .............. *G06F 3/017* (2013.01); *E04F 10/00* (2013.01); *E06B 9/68* (2013.01); *G06V 10/82* (2022.01);
(Continued)

(58) Field of Classification Search
CPC ............ E06B 9/322; E06B 9/386; E06B 9/28; E06B 9/308; E06B 9/68; E06B 9/264;
(Continued)

(56) References Cited

U.S. PATENT DOCUMENTS

| 2018/0052520 A1 | 2/2018 | Amores Llopis et al. |
| 2020/0269663 A1* | 8/2020 | Urano .................. G05D 1/0088 |
| 2022/0197392 A1* | 6/2022 | Zhou .................. G06F 3/04815 |

FOREIGN PATENT DOCUMENTS

CN 110895934 A 3/2020

\* cited by examiner

*Primary Examiner* — Rayeez R Chowdhury
(74) *Attorney, Agent, or Firm* — Zhigang Ma

(57) ABSTRACT

Sunshading louver control system and method based on gesture recognition are provided. Indoor images are collected in real time. Based on the indoor images, an action region of gesture motion is positioned and feature extraction is performed thereon to obtain hand motion parameters. The hand motion parameters are analyzed to obtain gesture information. The gesture information is compared with preset gesture information. When the preset gesture information contains the gesture information, corresponding adjustment is performed on a sunshading louver according to a preset operation logic corresponding to the gesture information. When the preset gesture information does not contain the gesture information, the gesture information is determined to be invalid. The lifting and rotation angles of the louver can be automatically controlled according to various gestures of indoor personnel, thereby rapidly realizing regulation of indoor illumination and natural ventilation quantity, and meeting the change of personnel's demand for indoor environment.

10 Claims, 3 Drawing Sheets

(51) Int. Cl.
  *G06V 40/20* (2022.01)
  *G06V 10/82* (2022.01)
  *G10L 15/18* (2013.01)
  *G10L 15/22* (2006.01)
  *E04F 10/00* (2006.01)
  *E06B 9/68* (2006.01)
  *G10L 15/16* (2006.01)

(52) U.S. Cl.
  CPC .............. *G06V 40/10* (2022.01); *G06V 40/28* (2022.01); *G10L 15/16* (2013.01); *G10L 15/1815* (2013.01); *G10L 15/22* (2013.01); *E06B 2009/6818* (2013.01); *G06V 2201/07* (2022.01); *G10L 2015/223* (2013.01)

(58) Field of Classification Search
  CPC ..... E06B 9/38; E06B 9/44; E06B 9/26; E06B 9/30; E06B 9/36; E06B 9/42; E06B 2009/2417; E06B 3/677; E06B 9/303; E06B 9/384; E06B 9/56; E06B 2009/2476; E06B 2009/2643; E06B 7/084; E06B 7/086; E06B 7/14; E06B 7/16; E06B 9/0661; E06B 9/32; E06B 9/323; E06B 9/34; E06B 9/361; E06B 9/367; E06B 9/368; G06F 3/04883; G06F 3/016; G06F 21/31; G06F 21/83; G06F 2221/031; G06F 3/017; G06F 16/9535; G06F 3/0233; G06F 3/0481; G06F 3/04847; G06F 2203/04808; G06F 3/011; G06F 18/214; G06F 3/0219; G06F 3/0304; G06F 3/0484; G06F 3/0488; G06F 18/22

See application file for complete search history.

INTELLIGENT SUNSHADING LOUVER CONTROL SYSTEM AND METHOD BASED ON GESTURE RECOGNITION

TECHNICAL FIELD

The invention relates to the field of intelligent sunshading, in particularly to an intelligent sunshading louver control system based on gesture recognition and an intelligent sunshading louver control method based on gesture recognition.

BACKGROUND

People spend about 90% of their lives indoors, and the indoor environment can greatly affect a person's physiology, psychology and work efficiency, therefore it is particularly important to create comfortable indoor environment. Natural lighting and natural ventilation are important components of the indoor environment, and thus it is necessary to create good indoor light environment and ventilation environment. Studies have shown that bad indoor light environment can cause visual fatigue, damage to people's eyes, and also have a great negative impact on people's psychology, such as anxiety and tension, boredom and weakness. In the case of poor indoor ventilation, the indoor air quality will deteriorate, and concentrations of harmful gases such as carbon dioxide and formaldehyde will increase, resulting in adverse symptoms such as chest tightness, fatigue, lethargy and even asthma, which is extremely harmful to human health.

Good natural lighting not only can maximize the use of natural light instead of artificial lighting, reduce corresponding lighting energy consumption, but also can improve visual comfort of indoor environment and improve people's psychological states. However, there are still some uncertainties in natural light, which would vary not only according to geographical locations, orientations and layouts, but also with the change of day and night, season and climate. Natural ventilation makes use of pressure difference to make outdoor fresh air automatically enter the room, so as to renew the indoor air polluted by the living process, which not only can improve the indoor air quality and the comfort of the indoor environment, but also can meet the psychological health needs of indoor personnel. However, the natural ventilation is easily affected by surrounding environment of a building and the outdoor climate. Therefore, how to use natural light and outdoor air reasonably and effectively has become one of most important problems to be solved.

A sunshading louver, by way of lifting and rotation of louver blades, not only can reasonably control direct sunlight to enter the room to effectively prevent glare, but also can ensure the natural ventilation in the room, thereby achieving the effect of both sunshading and ventilation. Moreover, the sunshading louver has characteristics of simple operation, flexible adjustment and the like, and only by adjusting a lifting height or a rotation angle of the louver blades, the indoor light illumination and ventilation can be flexibly adjusted, thereby creating different indoor light effects and blowing effects, and increasing the flexibility of the indoor environment. In addition, most of louvers are made of light materials, easy to adjust, and not easy to stretch and deform, and therefore are often used in building shading.

At present, commonly used indoor sunshading louver systems mostly employ a single control mode such as manual, remote control or network control, but these control modes are lack of certain flexibility and intelligence, cannot make timely and accurate feedback according to needs of indoor personnel, have a certain degree of delay and inflexibility, and therefore cannot well meet people's requirements for indoor comfort.

SUMMARY

In order to solve the problems in the related art, the invention aims to provide intelligent sunshading louver control system and method based on gesture recognition, so as to automatically control lifting and rotation angle of a louver according to various gestures of indoor personnel, thereby realizing regulation of indoor lighting and natural ventilation quantity in a timely and rapid manner, and meeting the change of personnel's demand for indoor environment, which can greatly reduce the operation burden of personnel, free both hands and thus it is more intelligent and can provide convenience for users.

The invention can be realized by technical solutions as follows.

Specifically, an intelligent sunshading louver control system based on gesture recognition may include: a data collector, an information processing unit, an information determining unit, and a terminal control unit;

the data collector is configured (i.e., structured and arranged) to acquire indoor images in real time and send the indoor images to the information processing unit;

the information processing unit includes a gesture information processing module, the gesture information processing module is configured to receive the indoor images, position an action region of gesture motion of indoor personnel based on the indoor images through a deep learning algorithm, perform feature extraction on the action region to obtain hand motion parameters, and send the hand motion parameters to the information determining unit;

the information determining unit includes an analysis module and a gesture determining module, the analysis module is configured to receive the hand motion parameters, analyze gesture information based on the hand motion parameters, and send the gesture information to the gesture determining module; and the gesture determining module is configured to receive the gesture information, determine preset gesture information whether contains the gesture information, output the gesture information to the terminal control unit when the preset gesture information contains the gesture information, and determine the gesture information to be invalid and do not output the gesture information when the preset gesture information does not contain the gesture information;

the terminal control unit includes a gesture control module, and the gesture control module is configured to receive the gesture information, convert the gesture information into a control command based on preset operation logics, and control lifting and rotation of a sunshading louver based on the control command.

In a preferred embodiment, the hand motion parameters include: a hand movement direction, a hand movement angle, and a hand movement distance.

Moreover, the preset gesture information includes: upward hand lifting, downward hand lifting, forward hand waving, and backward hand waving.

Furthermore, the preset operation logics include: the upward hand lifting corresponds to a control command of the sunshading louver raising, the downward hand lifting corresponds to a control command of the sunshading louver falling, the forward hand waving corresponds to a control command of an opening of the sunshading louver becoming smaller, and the backward hand waving corresponds to a control command of the opening of the sunshading louver becoming larger.

In addition, a height of raising or falling of the sunshading louver is determined based on the hand movement distance, and a change range/amplitude of the opening of the sunshading louver is determined based on the hand movement angle.

In a preferred embodiment, the information processing unit further includes a personnel detection module, and the personnel detection module is configured to receive the indoor images, detect whether there is indoor personnel based on the indoor images through a target detection algorithm, control the information determining unit, the artificial intelligence unit and the terminal control unit to start when it is detected that there is indoor personnel, and control the information determining unit, the artificial intelligence unit and the terminal control unit to close when it is detected that there is no indoor personnel.

In a preferred embodiment, the sunshading louver control system based on gesture recognition further includes an artificial intelligence unit, and the artificial intelligence unit includes a voice broadcast module and a natural semantic recognition module;

when the gesture information received by the gesture determining module is gesture information contained in the preset gesture information, and one of conditions that a hand movement velocity exceeds 1 m/s, a hand movement amplitude is less than 10 degrees, and the hand movement distance is less than 20 cm is met, the gesture information is determined to be unconventional gesture information, and the artificial intelligence unit is triggered to start;

the voice broadcast module is configured to ask the indoor personnel about gesture information; the natural semantic recognition module is configured to recognize reply content of the indoor personnel; the gesture determining module is further configured to compare the reply content with the gesture information received by the gesture determining module, determine the gesture information received by the gesture determining module whether is accurate, output the gesture information to the terminal control unit when it is determined that the gesture information is accurate, and control the data collector to acquire indoor images again to acquire new gesture information when it is determined that the gesture information is not accurate.

In a preferred embodiment, the sunshading louver control system based on gesture recognition further includes an artificial intelligence unit, the artificial intelligence unit includes a natural semantic recognition module, and the terminal control unit comprises a voice control module;

the natural semantic recognition module is configured to receive voice commands of the indoor personnel, recognize a voice command of controlling the sunshading louver through a semantic recognition algorithm, and send the recognized voice command to the voice control module of the terminal control unit;

the voice control module is configured to receive the voice command output from the natural semantic recognition module, and regulate the sunshading louver based on the voice command.

In a preferred embodiment, the terminal control unit further includes a remote control module;

the remote control module is configured to receive from a presskey controller a signal of regulating the sunshading louver, and control lifting and rotation of the sunshading louver based on the signal.

In another aspect, a sunshading louver control method based on gesture recognition, implemented by the above sunshading louver control system based on gesture recognition, includes:

collecting indoor images in real time;

based on the indoor images, positioning an action region of gesture motion and performing feature extraction on the action region to obtain hand motion parameters; and analyzing the hand motion parameters to obtain gesture information; comparing the gesture information with preset gesture information; and performing corresponding adjustment on a sunshading louver according to a preset operation logic corresponding to the gesture information when the preset gesture information contains the gesture information, or determining the gesture information to be invalid when the preset gesture information does not contain the gesture information.

Compared with the related art, the invention may achieve the following beneficial effects.

Embodiments of the invention provide an intelligent sunshading louver control system based on gesture recognition, which aims to automatically regulate the sunshading louver according to whether there is indoor personnel and information such as the movement direction, movement distance and movement angle of a hand, so as to improve indoor illumination environment and ventilation environment, and is beneficial to building comfortable indoor environment. The embodiments of the invention employ a gesture recognition control mode, which can greatly reduce the operation burden of personnel, liberate both hands, and thus it is more intelligent and can provide convenience for users.

Moreover, the personnel detection module is employed to determine whether there is indoor personnel, when the information processing unit detects that there is indoor personnel, the system is started; and when the information processing unit detects that there is no indoor personnel, the system is closed, so that energy waste can be avoided.

Furthermore, the embodiment of the invention provides an artificial intelligence unit and utilizes the voice broadcast module to determine the accuracy of the hand gesture in a questioning manner, thereby reducing misjudgment of system and enhancing accuracy of system operation.

In addition, the embodiment of the invention provides a natural semantic recognition module, so that the lifting and the rotation of the sunshading louver can be controlled in a mode of inputting a voice command, which can avoid the problem of sudden out of control of single control mode, thereby enhance working performance of the whole system, and moreover multiple control modes can meet operation preferences of different people.

The embodiment of the invention provides a remote control module, so that the lifting and the rotation of the sunshading louver can be controlled in a mode of key command, which can avoid the problem of sudden out of control of single control mode, thereby enhance the working performance of the whole system, and moreover multiple control modes can meet operation preferences of different people.

DESCRIPTION OF REFERENCE NUMERALS IN THE DRAWINGS

1—working area, 2—ordinary camera, 3—voice broadcast device, 4—sunshading louver.

DETAILED DESCRIPTION OF EMBODIMENTS

In order to further understand the invention, the invention will be described below in conjunction with embodiments, which are merely for further explaining features and advantages of the invention and are not intended to limit the claims of the invention.

Figure 1:
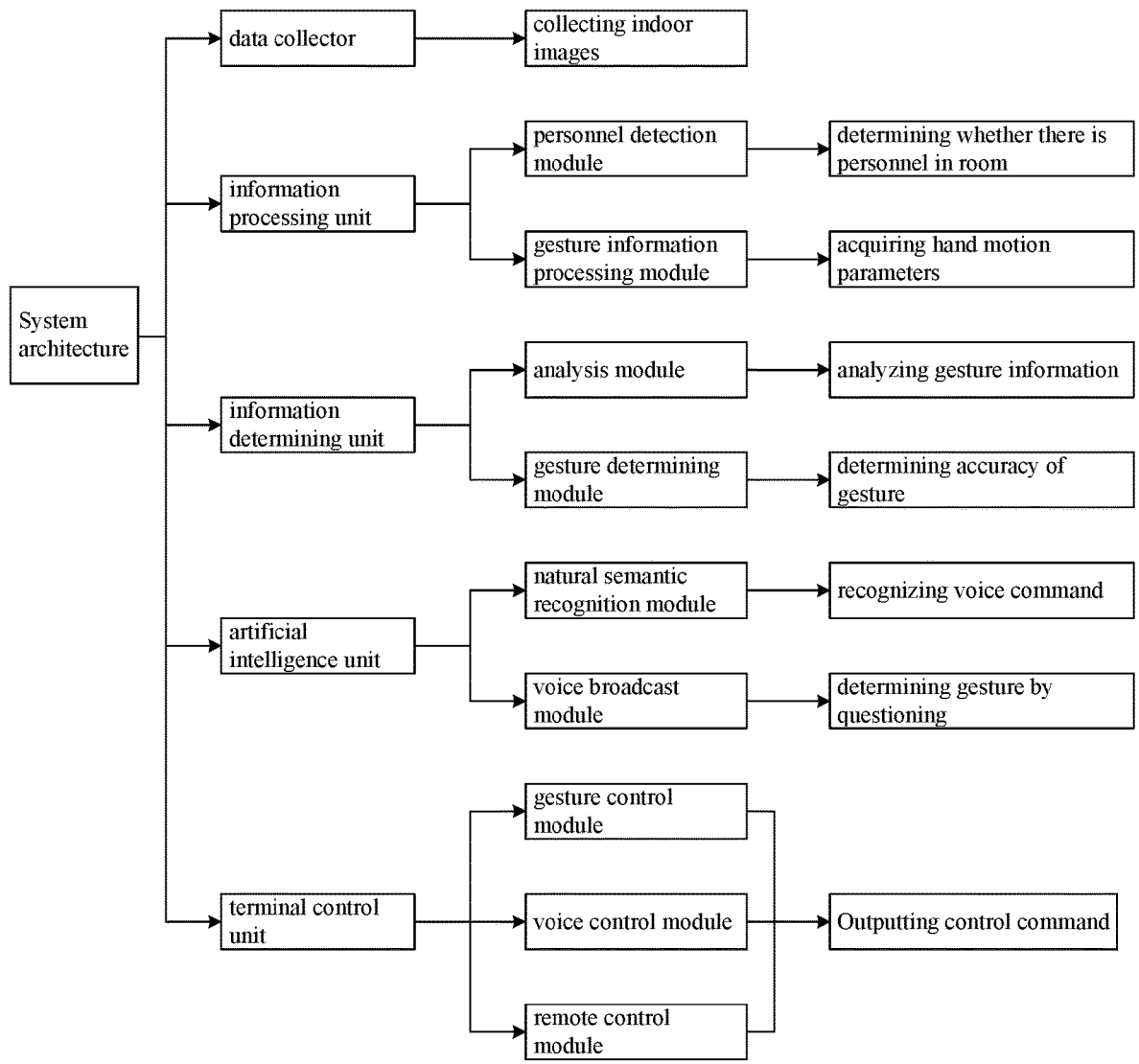
FIG. 1 illustrates a schematic structural diagram of an intelligent sunshading louver control system based on gesture recognition according to the invention.

As illustrated in FIG. 1, an intelligent sunshading louver control system based on gesture recognition according to the invention includes: data collector, an information processing unit, an information determining unit, an artificial intelligence unit, and a terminal control unit. In an exemplary embodiment, the information processing unit, the information determining unit, the artificial intelligence unit, and the terminal control unit are software modules stored in one or more memories and executable by one or more processors coupled to the one or more memories, but the invention is not limited to this exemplary embodiment.

The data collector mainly includes an ordinary camera, and is mainly configured (i.e., structured and arranged) to acquire indoor images in real time and thereby provide enough data for the information processing unit.

The information processing unit mainly includes a personnel detection module and a gesture information processing module. The personnel detection module is mainly configured to receive the indoor images acquired by the data collector and analyze whether there is indoor personnel according to the images. In order to obtain a result of whether there is indoor personnel, a target detection algorithm can be employed, specifically, a Tiny YOLOv3 (abbreviation for you only look once version 3-tiny) algorithm is employed to detect the indoor image. When the personnel detection module detects that there is indoor personnel, the information determining unit, the artificial intelligence unit and the terminal control unit are started; whereas, when it is detected that there is no indoor personnel, the information determining unit, the artificial intelligence unit, and the terminal control unit will be in a closed state.

Furthermore, the Tiny YOLOv3 algorithm is used to detect the indoor personnel in each frame of image, and predict a bounding box containing the personnel and a confidence of each bounding box, so as to obtain a position of the indoor personnel in the image.

IOU is an evaluation index used to evaluate a predicted box and a real box, which can reflect similarity between the predicted box and the real box, as shown in formula (1).

$$IOU(\text{box},\text{centroid}) = \text{box} \cap \text{cnetroid}/\text{box} \cup B\text{centroid} \quad \text{Formula (1)};$$

For a distance measurement of a candidate box cluster, it is calculated using the formula (2):

$$\text{distince}(\text{box},\text{centroid}) = 1 - IOU(\text{box},\text{centroid}) \quad \text{Formula (2)};$$

where, box represents a collection of real box, centroid represents a collection of cluster center of bounding box, IOU(box, centroid) represents a ratio of intersection to union of the real box and the center of bounding box. The larger the IOU value, the higher the correlation between the two, i.e., the closer the two.

The gesture information processing module is mainly configured to receive the indoor images acquired by the data collector, position an action region of a dynamic gesture motion by employing a deep learning algorithm, specifically employing the Fast-RCNN algorithm, and perform feature extraction on the action region to acquire hand motion parameters. The hand motion parameters may include a hand movement direction, a hand movement angle, and a hand movement distance.

The information determining unit mainly includes an analysis module and a gesture determining module. The analysis module is configured to receive the hand motion parameters acquired by the information processing unit, and analyze to obtain corresponding gesture information according to the hand motion parameters. The analysis module can determine a motion track of a hand according to the movement direction, the movement angle and the movement distance of the hand. For example, if the hand movement direction is upward, the hand movement angle is 0°, and the hand movement distance is 5 cm, the gesture information analyzed by the analysis module is upward hand lifting by 5 cm; if the hand movement direction is forward, the movement angle is 60°, and the movement distance is 0 cm, the gesture information analyzed by the analysis module is forward rotation by 60°. The gesture determining module is mainly configured to receive the gesture information analyzed by the analysis module, determine whether the gesture information exists in preset gesture information or not, and then output the gesture information to the terminal control unit when the gesture determining module determine that the received gesture information exists in the preset gesture information. When the gesture determining module determines that the received gesture information does not exist in the preset gesture information, such as forward translation or backward translation, the gesture information is determined to be invalid, and the gesture information is not output. When the gesture determining module determines that the received gesture information is the gesture information existing in the preset information, and a hand movement velocity exceeds 1 m/s, or a hand movement amplitude is less than 10 degrees, or the hand movement distance is less than 20 cm, the gesture information is determined to be unconventional gesture information, and a voice broadcast module in the artificial intelligence unit is activated.

The artificial intelligence unit includes the voice broadcast module and a natural semantic recognition module. The voice broadcast module can be started only when the gesture information is detected to be unconventional gesture information, and is mainly configured to determine accuracy of the acquired gesture information in a questioning manner, when the acquired gesture information is accurate, the gesture information then is output; and when it is not accurate, the data collector collects indoor images again to acquire new gesture information. Or, the indoor personnel further can use a mode of inputting a voice command to control the lifting and the rotation of the sunshading louver through the voice command.

The natural semantic recognition module is configured to receive voice commands of indoor personnel, recognize through a semantic recognition algorithm a voice command of lifting or rotating the sunshading louver issued by the personnel, and perform different controls on the sunshading louver according to different voice commands.

The terminal control unit includes a gesture control module, a voice control module, and a remote control module. The gesture control module is configured to receive the gesture information output by the information determining unit and convert the gesture information into a corresponding control command according to preset operation logics, thereby realizing the function of controlling the lifting and rotation of the sunshading louver. The voice control module is configured to receive voice commands output by the natural semantic recognition module and realize different regulation on the sunshading louver according to different voice commands. The remote control module is mainly configured to receive a signal of regulating the sunshading louver transmitted from a presskey controller to the terminal control unit, and control the sunshading louver to lift and rotate according to the signal.

Figure 4A:
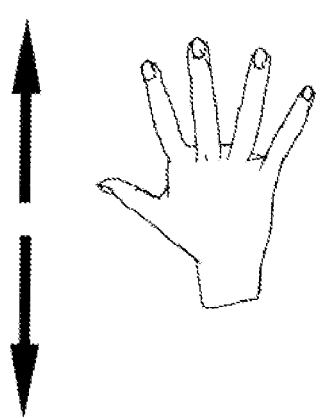
FIG. 4A and FIG. 4B illustrate schematic views of gesture information according to the invention.
Figure 4B:
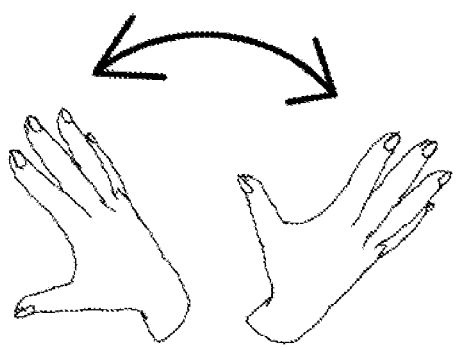

As illustrated in FIG. 4A and FIG. 4B, the gesture information preferably employs the following types: upward hand lifting, downward hand lifting, forward hand waving, and backward hand waving. Preferred operation logics are that: according to the above different gesture information, actions of the sunshading louver are respectively raising, falling, opening becoming smaller, and opening becoming larger. A lifting height of the sunshading louver is determined according to the movement distance of the gesture, and the opening amplitude/range of the sunshading louver is determined according to the movement angle of the gesture. Users may choose other control logics according to their own habits.

Figure 3:
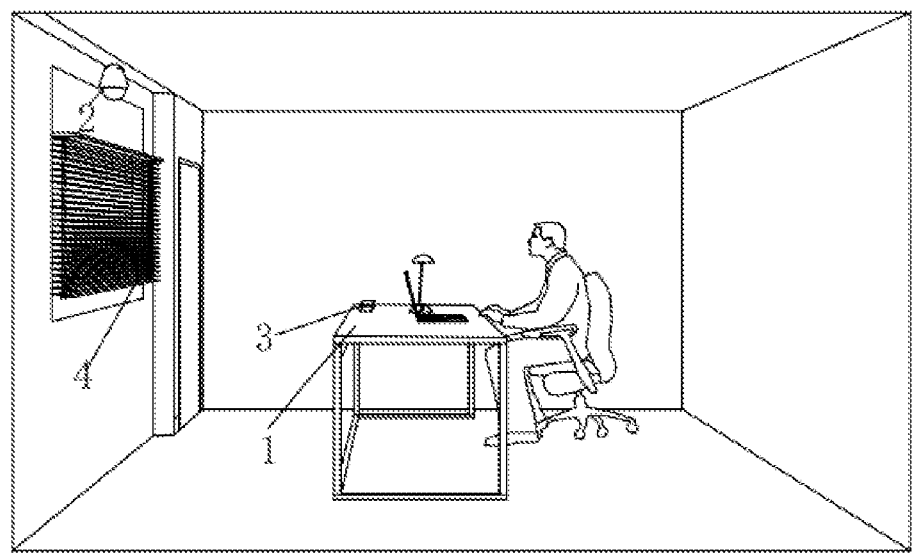
FIG. 3 illustrates a schematic view of device installation according to the invention.

As illustrated in FIG. 3, the ordinary camera 2 is installed at the top of a room, and a best shooting distance from the working area 1 of the indoor personnel is 0.8-3.5 meters, so that the camera can clearly capture a scene of an upper body of the personnel. Preferably, the voice broadcast device 3 employs a speaker, and the speaker is preferably placed on a desktop, so that the indoor personnel can clearly and accurately hear the broadcast voice information without affecting the work of the personnel.

Figure 2:
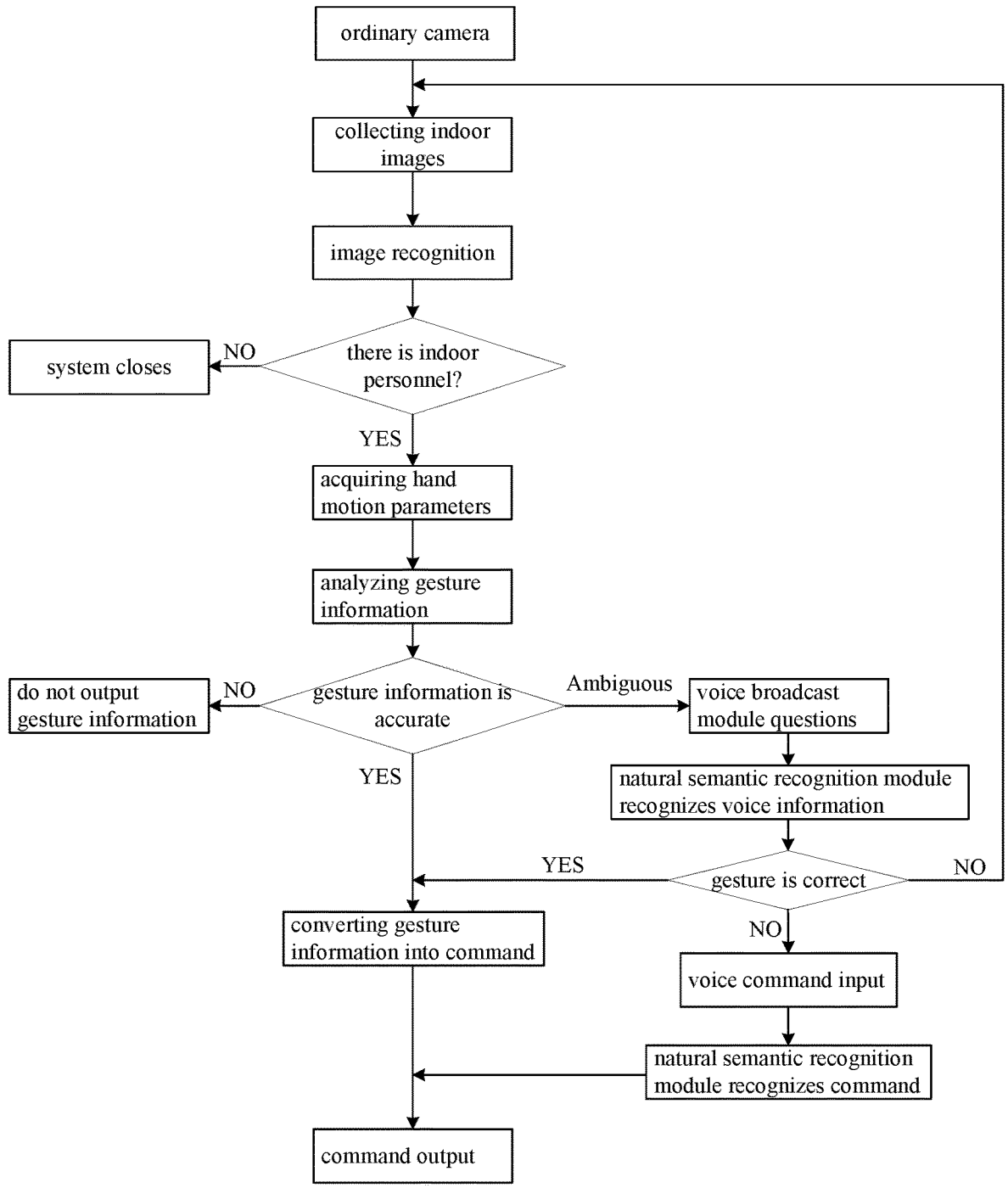
FIG. 2 illustrates a schematic flowchart of intelligent sunshading louver control based on gesture recognition according to the invention.

As illustrated in FIG. 2, a control method according to the invention may be as follows.

The ordinary camera 2 installed at the top of the room collects indoor images in real time.

The personnel detection module uses the YOLOv3 algorithm to obtain indoor personnel information according to the indoor images. When the personnel detection module detects that there is no indoor personnel, the system automatically shuts down; whereas, when it detects that there is indoor personnel, the system boots/starts.

After the system boots, the gesture information processing module uses the Faster-RCNN algorithm to position an action region of a dynamic gesture motion according to the indoor images taken by the ordinary camera 2, and perform feature extraction on the action region to obtain hand motion parameters.

After receiving the hand motion parameters, the analysis module analyzes the hand motion parameters to obtain corresponding gesture information and outputs the gesture information to the gesture determining module. The gesture determining module compares the received gesture information with preset gesture information, when the preset gesture information includes/contains the gesture information, the gesture information is then output to a gesture control module of the terminal control unit, and the gesture control module makes corresponding adjustment to the sunshading louver according to preset operation logics; when the preset gesture information does not include the gesture information, the gesture information is determined to be invalid, and thus the gesture information is not output. Furthermore, when the gesture determining module determines that the received gesture information is the gesture information existing in the preset gesture information, but a hand movement velocity exceeds 1 m/s, or a hand movement amplitude is less than 10 degrees, or the hand movement distance is less than 20 cm, the gesture information is determined to be unconventional gesture information, and a voice broadcast module in the artificial intelligence unit is activated. The voice broadcast module will ask questions, after the indoor personnel answers, the natural semantic recognition module will recognize voice information according to the semantic recognition algorithm; and if the information is accurate, it will continue to output the gesture information to the terminal control unit, whereas if it is not accurate, the data collector will collect indoor images again to obtain new gesture information. Or, the indoor personnel can further employ a mode of inputting a voice command, and the voice control module controls the lifting and the rotation of the sunshading louver according to the received voice command.

The terminal control unit may further include a remote control module, so that the sunshading louver can be adjusted through a presskey controller.

The illustrated embodiments of the invention employ a gesture recognition control mode, which can greatly reduce the operation burden of personnel, free both hands, and thus it is more intelligent and can provide convenience for users. Moreover, the illustrated embodiment of the invention further employs an artificial intelligence unit and utilizes the voice broadcast module to determine the accuracy of the hand gesture in a questioning mode, thereby can reduce misjudgment of system and enhance accuracy of system operation. In addition, the illustrated embodiment of the invention employs a natural semantic recognition module and a remote control module, and thus can use a mode of inputting a voice command or a mode of key command to control the lifting and the rotation of the sunshading louver, thereby can avoid the problem of sudden out of control in single control mode and enhance the working performance of the whole system consequently. Furthermore, multiple control modes can meet operation preferences of different people.

Working processes of other situations are similar to the above illustrated process, and thus will not be repeated herein.

What is claimed is:

1. A sunshading louver control system based on gesture recognition, comprising: a data collector, an information processing unit, an information determining unit, and a terminal control unit;
   wherein the data collector is configured to acquire indoor images in real time and send the indoor images to the information processing unit;
   wherein the information processing unit comprises a gesture information processing module, the gesture information processing module is configured to receive the indoor images, position an action region of gesture motion of indoor personnel based on the indoor images through a deep learning algorithm, perform feature extraction on the action region to obtain hand motion parameters, and send the hand motion parameters to the information determining unit;
   wherein the information determining unit comprises an analysis module and a gesture determining module, the analysis module is configured to receive the hand motion parameters, analyze gesture information based on the hand motion parameters, and send the gesture information to the gesture determining module; and the gesture determining module is configured to receive the gesture information, determine preset gesture information whether contains the gesture information, output the gesture information to the terminal control unit when the preset gesture information contains the gesture information, and determine the gesture information to be invalid and do not output the gesture information when the preset gesture information does not contain the gesture information;

wherein the terminal control unit comprises a gesture control module, and the gesture control module is configured to receive the gesture information, convert the gesture information into a control command based on preset operation logics, and control lifting and rotation of a sunshading louver based on the control command;

wherein the information processing unit, the information determining unit, and the terminal control unit are software modules stored in a memory and executable by processors connected to the memory.

2. The sunshading louver control system based on gesture recognition as claimed in claim 1, wherein the hand motion parameters comprise: a hand movement direction, a hand movement angle, and a hand movement distance.

3. The sunshading louver control system based on gesture recognition as claimed in claim 2, wherein the preset gesture information comprises: upward hand lifting, downward hand lifting, forward hand waving, and backward hand waving.

4. The sunshading louver control system based on gesture recognition as claimed in claim 3, wherein the preset operation logics comprise: the upward hand lifting corresponds to a control command of the sunshading louver raising, the downward hand lifting corresponds to a control command of the sunshading louver falling, the forward hand waving corresponds to a control command of an opening of the sunshading louver becoming smaller, and the backward hand waving corresponds to a control command of the opening of the sunshading louver becoming larger.

5. The sunshading louver control system based on gesture recognition as claimed in claim 4, wherein a height of raising or falling of the sunshading louver is determined based on the hand movement distance, and a change range of the opening of the sunshading louver is determined based on the hand movement angle.

6. The sunshading louver control system based on gesture recognition as claimed in claim 1, wherein the information processing unit further comprises a personnel detection module, and the personnel detection module is configured to receive the indoor images, detect whether there is indoor personnel based on the indoor images through a target detection algorithm, control the information determining unit, the artificial intelligence unit and the terminal control unit to start when it is detected that there is indoor personnel, and control the information determining unit, the artificial intelligence unit and the terminal control unit to close when it is detected that there is no indoor personnel.

7. The sunshading louver control system based on gesture recognition as claimed in claim 1, further comprising an artificial intelligence unit stored in a memory and executable by one or more processors; wherein the artificial intelligence unit comprises a voice broadcast module and a natural semantic recognition module;

wherein when the gesture information received by the gesture determining module is gesture information contained in the preset gesture information, and one of conditions that a hand movement velocity exceeds 1 m/s, a hand movement amplitude is less than 10 degrees, and the hand movement distance is less than 20 cm is met, the gesture information is determined to be unconventional gesture information, and the artificial intelligence unit is triggered to start;

wherein the voice broadcast module is configured to ask the indoor personnel about gesture information;

wherein the natural semantic recognition module is configured to recognize reply content of the indoor personnel;

wherein the gesture determining module is further configured to compare the reply content with the gesture information received by the gesture determining module, determine the gesture information received by the gesture determining module whether is accurate, output the gesture information to the terminal control unit when it is determined that the gesture information is accurate, and control the data collector to acquire indoor images again to acquire new gesture information when it is determined that the gesture information is not accurate.

8. The sunshading louver control system based on gesture recognition as claimed in claim 1, further comprising an artificial intelligence unit stored in the memory and executable by one or more of the processors; wherein the artificial intelligence unit comprises a natural semantic recognition module, and the terminal control unit comprises a voice control module;

wherein the natural semantic recognition module is configured to receive voice commands of the indoor personnel, recognize a voice command of controlling the sunshading louver through a semantic recognition algorithm, and send the recognized voice command to the voice control module of the terminal control unit;

wherein the voice control module is configured to receive the voice command output from the natural semantic recognition module, and regulate the sunshading louver based on the voice command.

9. The sunshading louver control system based on gesture recognition as claimed in claim 1, wherein the terminal control unit further comprises a remote control module, and the remote control module is configured to receive from a presskey controller a signal of regulating the sunshading louver, and control lifting and rotation of the sunshading louver based on the signal.

10. A sunshading louver control method based on gesture recognition, implemented by the sunshading louver control system based on gesture recognition as claimed in claim 1, comprising:

collecting indoor images in real time;

based on the indoor images, positioning an action region of gesture motion and performing feature extraction on the action region to obtain hand motion parameters; and analyzing the hand motion parameters to obtain gesture information; comparing the gesture information with preset gesture information; and performing corresponding adjustment on a sunshading louver according to a preset operation logic corresponding to the gesture information when the preset gesture information contains the gesture information, or determining the gesture information to be invalid when the preset gesture information does not contain the gesture information.

* * * * *